United States Patent
Kameoka et al.

(10) Patent No.: US 7,976,171 B2
(45) Date of Patent: Jul. 12, 2011

(54) PROJECTOR COOLING SYSTEM WITH TIME DEPENDENT TEMPERATURE THRESHOLD

(75) Inventors: Ayumu Kameoka, Utsunomiya (JP); Toshiyuki Noda, Utsunomiya (JP)

(73) Assignee: Canon Kabushiki Kaisha (JP)

(*) Notice: Subject to any disclaimer, the term of this patent is extended or adjusted under 35 U.S.C. 154(b) by 341 days.

(21) Appl. No.: 12/187,450

(22) Filed: Aug. 7, 2008

(65) Prior Publication Data
US 2009/0040468 A1    Feb. 12, 2009

(30) Foreign Application Priority Data
Aug. 7, 2007   (JP) ................................ 2007-204921

(51) Int. Cl.
G03B 21/16   (2006.01)
G03B 21/18   (2006.01)
G03B 21/26   (2006.01)
(52) U.S. Cl. .......................................... 353/57; 353/52
(58) Field of Classification Search .................... 353/52, 353/55, 57–58, 60–61, 122, 85
See application file for complete search history.

(56) References Cited

U.S. PATENT DOCUMENTS

| 6,554,432 | B2* | 4/2003 | Ohfune et al. | 353/57 |
| 6,588,907 | B1* | 7/2003 | Billington et al. | 353/57 |
| 6,621,239 | B1 | 9/2003 | Belliveau | |
| 6,992,811 | B2* | 1/2006 | Williams et al. | 359/291 |
| 7,111,944 | B2* | 9/2006 | Morishita | 353/85 |
| RE41,726 | E* | 9/2010 | Belliveau | 315/112 |
| 2005/0024600 | A1 | 2/2005 | Cole et al. | |
| 2006/0012758 | A1* | 1/2006 | Fukano | 353/85 |
| 2006/0082732 | A1* | 4/2006 | Miwa et al. | 353/57 |
| 2007/0052930 | A1 | 3/2007 | Ki | |
| 2008/0225525 | A1* | 9/2008 | Wang et al. | 362/294 |
| 2010/0001943 | A1* | 1/2010 | Leo et al. | 345/101 |

FOREIGN PATENT DOCUMENTS

| CN | 1577064 A | 2/2005 |
| JP | 2001-021999 A | 1/2001 |
| JP | 2001-312000 A | 11/2001 |
| JP | 2005-292589 A | 10/2005 |
| JP | 2007-101996 A | 4/2007 |
| WO | 2007/049659 A1 | 5/2007 |

OTHER PUBLICATIONS

European Search Report issued on Feb. 5, 2009 for corresponding European Patent Application No. 08161534.
Office Action issued in corresponding Chinese Patent Application No. 200810145340.8 dated Jul. 24, 2009.

* cited by examiner

Primary Examiner — Tony Ko
Assistant Examiner — Jori S Reilly-Diakun
(74) Attorney, Agent, or Firm — Rossi, Kimms & McDowell LLP

(57) ABSTRACT

The image projection apparatus includes a temperature detector that detects a temperature inside of the apparatus, and a controller that performs a protection operation when the temperature detected by the temperature detector is higher than a predetermined temperature. The controller measures an elapsed time from when a power of the apparatus is turned on, and changes the predetermined temperature in accordance with the elapsed time. This apparatus can avoid mistaken activation or inactivation of a protection function at the time of re-lighting of the light source due to the influence of the residual heat after the light source is turned off.

7 Claims, 10 Drawing Sheets

PROJECTOR COOLING SYSTEM WITH TIME DEPENDENT TEMPERATURE THRESHOLD

BACKGROUND OF THE INVENTION

The present invention relates to an image projection apparatus such as a liquid crystal projector, and more particularly to an image projection apparatus having a function of avoiding an overheated state inside of the apparatus.

In the image projection apparatus (hereinafter referred to as projector), while heat generating devices (exothermic devices) such as a light source and devices included in a power supply system are used, many heat-vulnerable components such as optical components and electrical elements which are formed of resin materials are used. Therefore, the projector has a heat exhausting structure (cooling structure) that cools the heat generating devices with airflows created by cooling fans and exhausts the airflows taking heat from the heat generating devices through an exhaust air outlet to the outside.

However, when the projector is used in a state in which the exhaust air outlet is disposed close to an obstacle such as an indoor wall (that is, in a state in which the exhaust air outlet is blocked), the heat exhaust efficiency of the projector is deteriorated, which causes an excessive temperature increase inside of the projector. Thereby, thermal damage occurs in the heat-vulnerable components, which may deteriorate the performance of the projector and reduce the lifetime thereof.

Japanese Patent Laid-Open No. 2001-312000 discloses a projector in which a temperature abnormality is determined when the temperature detected by a temperature sensor installed in the projector exceeds a predetermined temperature, and then a protection function is activated.

In addition, Japanese Patent No. 3895889 discloses a projector in which a temperature abnormality is determined when the increase rate of the temperature of the light source lamp exceeds a predetermined increase rate, and then a protection function is activated.

However, the projector is sometimes used such that, in a state in which the temperature around a temperature sensor placed, for example, in the vicinity of the light source lamp is still high due to residual heat of the lamp after being turned off, the lamp is re-lit. In such a case, in the projector disclosed in Patent Laid-Open No. 2001-312000, when the temperature around the temperature sensor at the time of re-lighting of the lamp exceeds a predetermined temperature that is a threshold temperature at which the protection function is activated, the protection function is mistakenly activated even though essentially there is no problem.

On the other hand, when compared to a case where the temperature increases due to the lighting of the lamp from a state in which the temperature around the temperature sensor is low, the increase rate of the temperature is lower in a case where the temperature further increases due to the re-lighting of the lamp from a state in which the temperature around the temperature sensor is high. Therefore, in the latter case, even if the projector disclosed in Japanese Patent No. 3895889 is used in the state in which the exhaust air outlet is blocked, the protection function may not be activated because the temperature increase rate detected by the temperature sensor does not exceed the predetermined increase rate.

BRIEF SUMMARY OF THE INVENTION

The present invention provides an image projection apparatus capable of avoiding mistaken activation or inactivation of a protection function at the time of re-lighting of the light source due to the influence of the residual heat after the light source is turned off.

The present invention provides, according to an aspect thereof, an image projection apparatus including a temperature detector that detects a temperature inside of the apparatus, and a controller that performs a protection operation when the temperature detected by the temperature detector is higher than a predetermined temperature. The controller measures an elapsed time from when a power of the apparatus is turned on, and changes the predetermined temperature in accordance with the elapsed time.

The present invention provides, according to another aspect thereof, an image projection apparatus including a temperature detector that detects a temperature inside of the apparatus, and a controller that performs a protection operation when the temperature detected by the temperature detector is higher than a predetermined temperature. The controller measures an elapsed time from when a light source is turned off to when a power of the apparatus is next turned on, and changes the predetermined temperature in accordance with the elapsed time.

Other aspects of the present invention will be apparent from the embodiments described below with reference to the drawings.

DETAILED DESCRIPTION OF THE EMBODIMENTS

Exemplary embodiments of the present invention will be described below with reference to the accompanied drawings.

Embodiment 1

(Overall Configuration of Projector)

Figure 1:
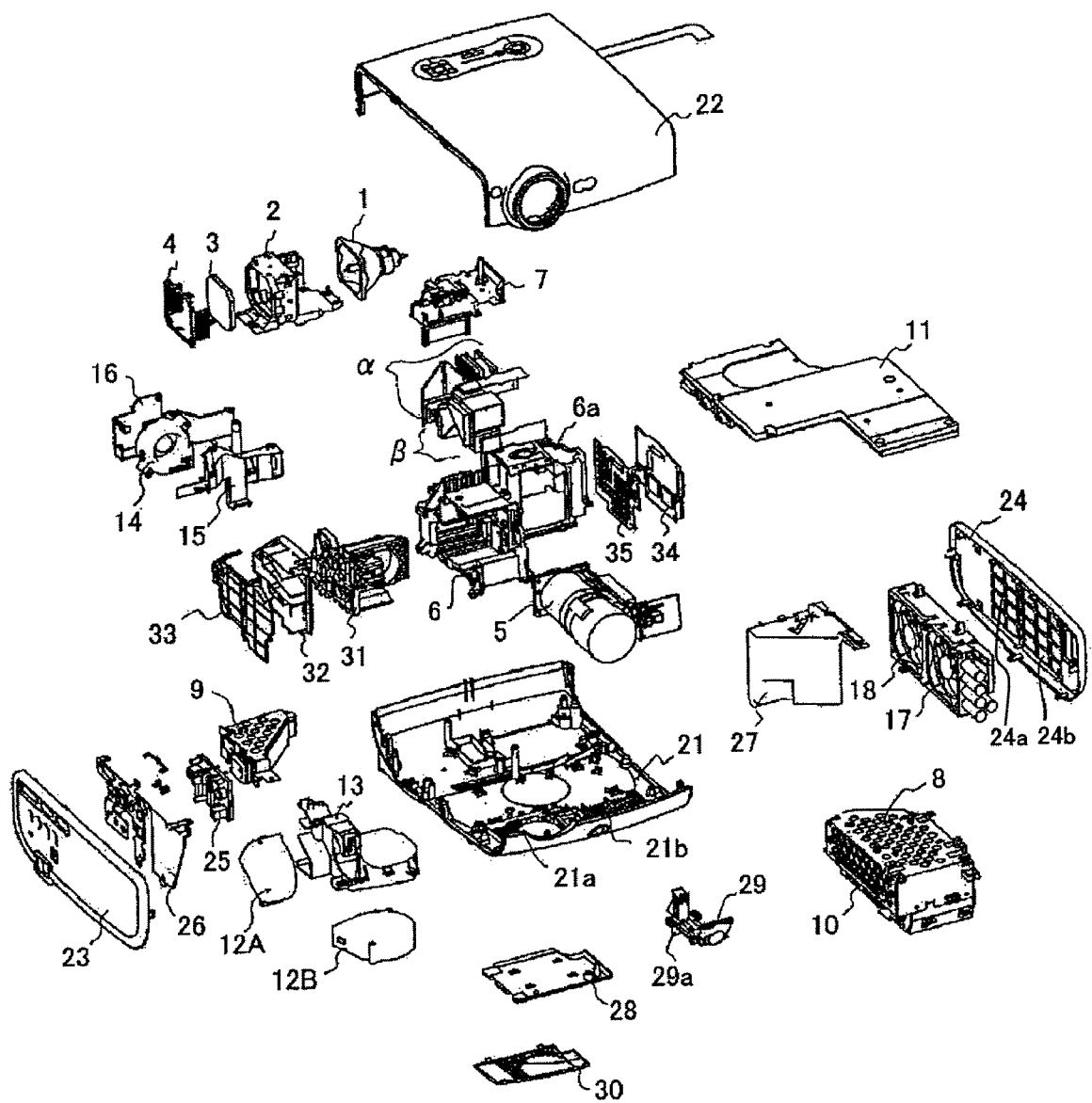
FIG. 1 is an exploded perspective view of a projector which is a first embodiment (Embodiment 1) of the present invention.

FIG. 1 shows the configuration of a liquid crystal projector (image projection apparatus) that is a first embodiment (Embodiment 1) of the present invention.

In this figure, reference numeral 1 denotes a light source lamp (hereinafter referred to simply as "lamp"), which is an ultra high-pressure mercury discharge lamp in this embodiment. However, discharge lamps other than the ultra high-pressure mercury discharge lamp may be used as the lamp 1, such as a halogen lamp, a xenon lamp, and a metal halide lamp.

Reference numeral 2 denotes a lamp holder which holds the lamp 1, 3 an explosion-proof glass, and 4 a glass holder. Reference symbol α denotes an illumination optical system which converts light from the lamp 1 into collimated light with a uniform luminance distribution. Reference symbol β denotes a color separating/combining optical system. The color separating/combining optical system β separates the light from the illumination optical system α into a red (R) light component, a green (G) light component and a blue (B) light component, guides them to liquid crystal panels for R, G, and B, respectively, and then combines the light components from the liquid crystal panels.

Reference numeral 5 denotes a projection lens barrel which projects the light from the color separating/combining optical system β onto a projection surface such as a screen, not shown. A projection optical system, described later, is housed in the projection lens barrel 5.

Reference numeral 6 denotes an optical box which accommodates the lamp 1, the illumination optical system α, and the color separating/combining optical system β, and to which the projection lens barrel 5 is fixed. The optical box 6 has a lamp case portion (hereinafter referred to simply as lamp case) 6a formed thereon, which surrounds the lamp 1.

Reference numeral 7 denotes an optical box lid which covers the optical box 6 accommodating the illumination optical system α and the color separating/combining optical system β. Reference numeral 8 denotes a PFC (Power Factor Correction) power supply board which generates DC power for each of circuit boards from a commercial power supply. Reference numeral 9 denotes a power supply filter board, and 10 a ballast power supply board which drives (lights) the lamp 1 together with the PFC power supply board 8.

Reference numeral 11 denotes a control board which drives the liquid crystal panels and controls lighting of the lamp 1 with power from the PFC power supply board 8.

Reference numerals 12A and 12B denote first and second optical system cooling fans, respectively, which take in air through an air inlet 21a formed in a lower exterior case 21, later described, to cool optical elements such as the liquid crystal panels and polarizing plates provided in the color separating/combining optical system β.

Reference numeral 13 denotes a first RGB duct which guides the cooling airflows from the first and second optical system cooling fans 12A and 12B to the optical elements in the color separating/combining optical system β.

Reference numeral 14 denotes a lamp cooling fan which sends a blowing airflow to the lamp 1 to cool it. Reference numeral 15 denotes a first lamp duct which holds the lamp cooling fan 14 and guides the cooling airflow to the lamp 1. Reference numeral 16 denotes a second lamp duct which holds the lamp cooling fan 14 and forms the duct together with the first lamp duct 15.

Reference numeral 17 denotes a power supply cooling fan which takes in air through an air inlet 21b formed in the lower exterior case 21 to circulate a cooling airflow within the PFC power supply board 8 and the ballast power supply board 10 to cool them. Reference numeral 18 denotes an exhaust fan which exhausts air that has been provided from the lamp cooling fan 14 to the lamp 1 and whose temperature is increased by cooling the lamp 1 through an exhaust air outlet 24a formed in a second side plate 24, later described.

The lower exterior case 21 accommodates the lamp 1, the optical box 6, the power supply system boards 8 to 10, the control board 11 and the like.

Reference numeral 22 denotes an upper exterior case which covers the lower exterior case 21 accommodating the optical box 6 and the like. Reference numeral 23 denotes a first side plate which covers side openings formed by the cases 21 and 22 together with the second side plate 24. The lower exterior case 21 has the abovedescribed air inlets 21a and 21b formed therein, and the side plate 24 has the exhaust air outlet 24a and an air inlet 24b formed therein. The lower exterior case 21, the upper exterior case 22, the first side plate 23 and the second side plate 24 constitute a chassis (case) of the projector.

Reference numeral 25 denotes an interface board on which connectors for receiving various signals are mounted, and 26 an interface reinforcement plate attached to the inside face of the first side plate 23.

Reference numeral 27 denotes an exhaust duct which guides a heated exhaust air from the lamp 1 to the exhaust fan 18 to prevent diffusion of the exhaust air in the chassis.

Reference numeral 28 denotes a lamp lid. The lamp lid 28 is removably provided on the bottom of the lower exterior case 21 and is fixed thereto by screws, not shown. Reference numeral 29 denotes a set adjustment leg. The set adjustment leg 29 is fixed to the lower exterior case 21, and the height of its leg 29a is adjustable. The adjustment of the height of the leg 29a enables adjustment of an inclination angle of the projector.

Reference numeral 30 denotes an RGB air intake plate which holds a filter, not shown, attached to the outside of the air inlet 21a formed in the lower exterior case 21.

Reference numeral 31 denotes a prism base which holds the color separating/combining optical system β. Reference numeral 32 denotes a box side cover which has duct-shaped portions for guiding the cooling airflows from the first and second optical system cooling fans 12A and 12B for cooling the optical elements and the liquid crystal panels in the color separating/combining optical system β. Reference numeral 33 denotes a second RGB duct which forms the duct together with the box side cover 32.

Reference numeral 34 denotes an RGB board to which flexible boards extending from the liquid crystal panels disposed in the color separating/combining optical system β are connected and which is connected to the control board 11.

Reference numeral 35 denotes an RGB cover which prevents electrical noise from entering the RGB board.

(Optical Configuration)

Figure 2:
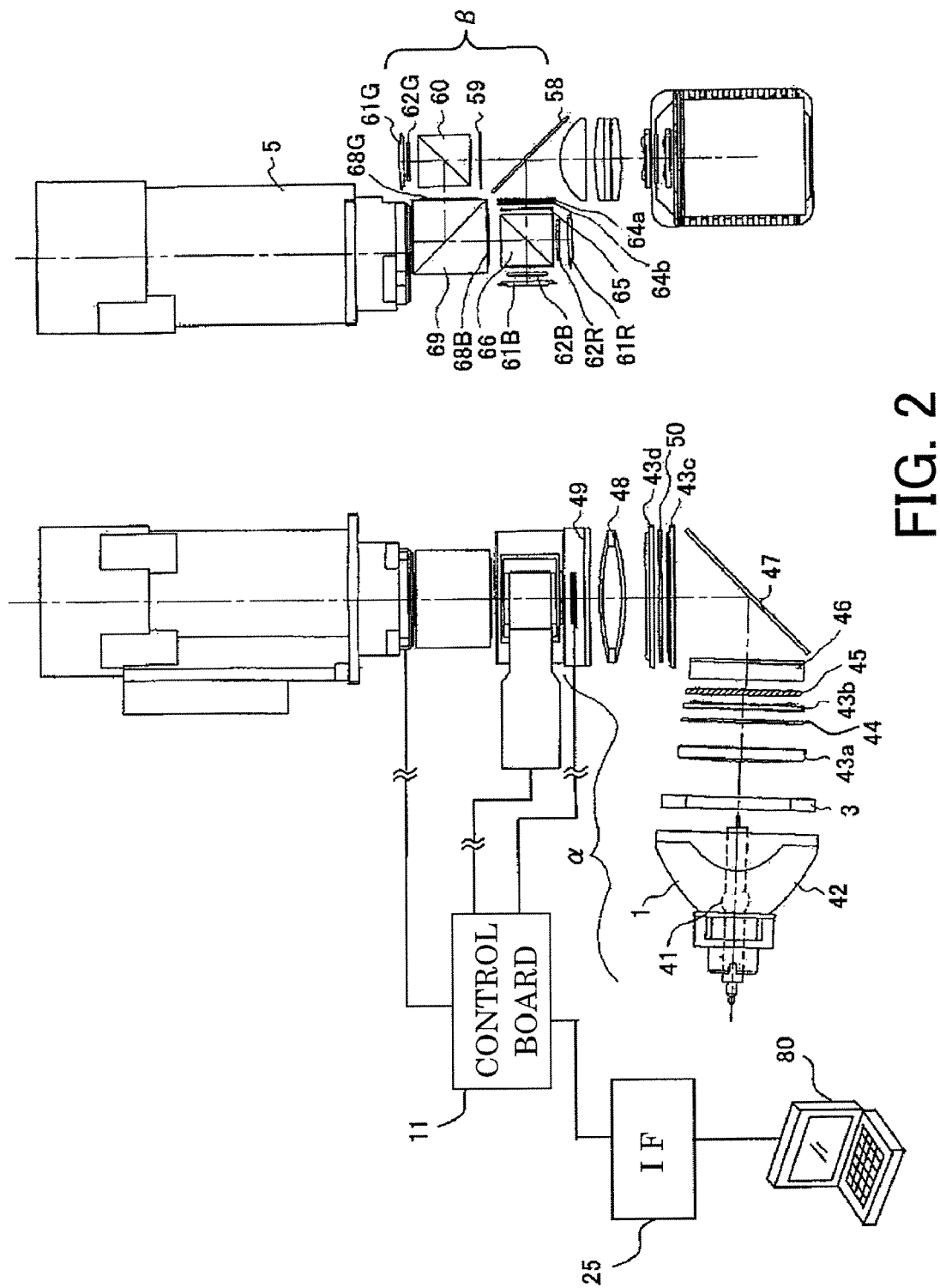
FIG. 2 is a plane view and a side view showing an optical configuration of the projector of Embodiment 1.

Next, description will be made of the configuration of the entire optical system formed of the abovedescribed lamp 1, the illumination optical system α, the color separating/combining optical system β and the projection lens barrel (projection optical system) 5 with reference to FIG. 2. FIG. 2 shows a horizontal section and a vertical section of the optical system.

In the figure, reference numeral 41 denotes a discharge light-emitting tube (hereinafter referred to simply as "light-emitting tube") which emits white light with a continuous spectrum, and 42 a reflector which has a concave mirror to collect the light from the light-emitting tube 41 in a predetermined direction. The light-emitting tube 41 and the reflector 42 constitute the lamp 1.

Reference numeral 43a denotes a first cylinder array which is formed by arranging plural cylindrical lens cells each having a refractive power in a horizontal direction shown in the left in the figure, 43b a second cylinder array which has plural cylindrical lens cells corresponding to the respective lens cells of the first cylinder array 43a. Reference numeral 44 denotes an ultraviolet absorbing filter, and 45 a polarization conversion element which converts non-polarized light into polarized light having a predetermined polarization direction.

Reference numeral 46 denotes a front compressor which is formed of a cylindrical lens having a refractive power in a vertical direction shown in the right in the figure. Reference numeral 47 denotes a reflecting mirror which bends an optical axis from the lamp 1 by substantially 90 degrees (in more detail, by 88 degrees).

Reference numeral 43c denotes a third cylinder array which is formed by arranging plural cylindrical lens cells each having a refractive power in the vertical direction. Reference numeral 43d denotes a fourth cylinder array which has plural cylindrical lens cells corresponding to the respective lens cells of the third cylinder array 43c.

Reference numeral 50 denotes a color filter which returns color light in a specific wavelength range to the lamp 1 for adjustment of color coordinates to predetermined values. Reference numeral 48 denotes a condenser lens. Reference numeral 49 denotes a rear compressor which is formed of a cylindrical lens having a refractive power in the vertical direction. The abovedescribed components constitute the illumination optical system α.

Reference numeral 58 denotes a dichroic mirror which reflects light in wavelength ranges of blue (B: for example, 430 nm to 495 nm) and red (R: for example, 590 nm to 650 nm) and transmits light in a wavelength range of green (G: for example, 505 nm to 580 nm). Reference numeral 59 denotes an entrance-side polarizing plate for G which includes a polarizing element attached on a transparent substrate and transmits only P-polarized light. Reference numeral 60 denotes a first polarization beam splitter which has a polarization splitting surface formed of a multi-layered film. The polarization splitting surface transmits P-polarized light and reflects S-polarized light.

Reference numerals 61R, 61G and 61B denote a reflective liquid crystal panel for R, a reflective liquid crystal panel for G, and a reflective liquid crystal panel for B, respectively, each being a light modulation element (or image-forming element) which reflects and image-modulates entering light. Reference numerals 62R, 62G and 62B denote a quarter-wave plate for R, a quarter-wave plate for G, and a quarter-wave plate for B, respectively.

Reference numeral 64a denotes a trimming filter which returns orange light to the lamp 1 for enhancing the color purity of red. Reference numeral 64b denotes an entrance-side polarizing plate for R and B which includes a polarizing element attached on a transparent substrate and transmits only P-polarized light.

Reference numeral 65 denotes a color-selective phase plate which converts a polarization direction of R light by 90 degrees and does not convert a polarization direction of B light. Reference numeral 66 denotes a second polarization beam splitter which has a polarization splitting surface transmitting P-polarized light and reflecting S-polarized light.

Reference numeral 68B denotes an exit-side polarizing plate for B which transmits only an S-polarized light component of the B light. Reference numeral 68G denotes an exit-side polarizing plate for G which transmits only S-polarized light of the G light. Reference numeral 69 denotes a dichroic prism which transmits the R light and the B light and reflects the G light.

The abovedescribed components from the dichroic mirror 58 to the dichroic prism 69 constitute the color separating/combining optical system β.

In this embodiment, the polarization conversion element 45 converts P-polarized light into S-polarized light. The P-polarized light and S-polarized light are herein described relative to the polarization direction of light at the polarization conversion element 45. On the other hand, the light entering the dichroic mirror 58 is considered relative to the polarization direction at the first and second polarization beam splitters 60 and 66, the light being regarded as P-polarized light. While the light emerging from the polarization conversion element 45 is S-polarized light, the S-polarized light is defined as P-polarized light when it enters the dichroic mirror 58.

(Optical Actions)

Next, the optical actions will be described. The light emitted from the light-emitting tube 41 is collected in the predetermined direction by the reflector 42. The reflector 42 has a parabolic shape, and the light flux from the focal point of the parabolic surface is converted into a light flux parallel to the axis of symmetry of the parabolic surface. However, since the light source in the light-emitting tube 41 is not an ideal point light source and has a finite size, the collected light flux contains a large amount of component not in parallel with the axis of symmetry of the parabolic surface.

The light flux enters the first cylinder array 43a through the explosion-proof glass 3. The light flux entering the first cylinder array 43a is divided into plural light fluxes in accordance with the number of the cylindrical lens cells thereof and collected thereby to form plural light fluxes each of which has a band-like shape and which are arranged in the vertical direction. These light fluxes are passed through the ultraviolet absorbing filter 44 and the second cylinder array 43b and then form plural images of the light source near the polarization conversion element 45.

The polarization conversion element 45 is constituted by polarization splitting surfaces, reflective surfaces, and half-wave plates. Each of the light fluxes enters the polarization splitting surface corresponding to its row and is separated into a P-polarized light component which has been transmitted through the polarization splitting surface and an S-polarized light component which has been reflected thereby. Thus, plural light fluxes having the same polarization direction emerge from the polarization conversion element 45

The plural light fluxes converted into the polarized light fluxes by the polarization conversion element 45 are compressed by the front compressor 46, reflected by the reflecting mirror 47 by 88 degrees, and then enter the third cylinder array 43c.

Each of the light flux entering the third cylinder array 43c is divided into plural light fluxes in accordance with the number of the cylindrical lens cells thereof and collected thereby to form plural light fluxes each of which has a band-like shape and which are arranged in the horizontal direction. The plural light fluxes are passed through the fourth cylinder array 43d and the condenser lens 48, and then enter the rear compressor 49.

With the optical actions of the front compressor 46, the condenser lens 48 and the rear compressor 49, rectangular images formed by the plural light fluxes are overlapped with each other to form a rectangular illumination area with a uniform luminance. Each of the reflective liquid crystal panels 61R, 61G and 61B is disposed in the illumination area.

The S-polarized light converted by the polarization conversion element 45 impinges on the dichroic mirror 58. An optical path of the G light transmitted through the dichroic mirror 58 will hereinafter be described.

The G light transmitted through the dichroic mirror 58 enters the entrance-side polarizing plate 59. The G light remains as P-polarized light (S-polarized light relative to the polarizing conversion element 45) after the separation by the dichroic mirror 58. The G light emerges from the entrance-side polarizing plate 59, enters the first polarization beam splitter 60 as P-polarized light, and then is transmitted through the polarization splitting surface thereof to reach the reflective liquid crystal panel 61G.

An image supply apparatus 80 such as a personal computer, a DVD player, and a television tuner is connected to the IF board 25 of the projector. The control circuit 11 drives the reflective liquid crystal panels 61R, 61G and 61B based on image (video) information input from the image supply apparatus 80 and causes them to form original images for the respective colors. Thus, the light entering each reflective liquid crystal panel is modulated (image-modulated) in accordance with the original image and reflected thereby. The projector and the image supply apparatus 80 constitute an image display system.

The reflective liquid crystal panel 61G image-modulates the G light and reflects it. The P-polarized light component of the image-modulated G light is again transmitted through the polarization splitting surface of the first polarization beam splitter 60 and thereby returned toward the light source to be removed from light for projection. On the other hand, the S-polarized light component of the image-modulated G light is reflected by the polarization splitting surface of the first polarization beam splitter 60 toward the dichroic prism 69 as light for projection.

In a state in which all the polarized light components are converted into P-polarized light (in a black display state), adjusting a slow axis of the quarter-wave plate 62G provided between the first polarization beam splitter 60 and the reflective liquid crystal panel 61G to a predetermined direction can reduce the influence of a disturbance of the polarization state caused in the first polarization beam splitter 60 and the reflective liquid crystal panel 61G.

The G light that has emerged from the first polarization beam splitter 60 enters the dichroic prism 69 as S-polarized light, and then is reflected by the dichroic film surface of the dichroic prism 69 to reach the projection lens barrel 5.

Optical paths of the R light and the B light reflected by the dichroic mirror 58 will hereinafter be described. The R light and B light reflected by the dichroic mirror 58 enter the trimming filter 64a. The R light and the B light remain as P-polarized light after the separation by the dichroic mirror 58. The R light and the B light are passed through the trimming filter 64a to remove the orange light component thereof, transmitted through the entrance-side polarizing plate 64b, and then enter the color-selective phase plate 65.

The color-selective phase plate 65 has the function of rotating the polarization direction of only R light by 90 degrees. Thus, the R light and the B light enter the second light beam splitter 66 as S-polarized light and P-polarized light, respectively.

The R light entering the second polarization beam splitter 66 as S-polarized light is reflected by the polarization splitting surface of the second polarization beam splitter 66 to reach the reflective liquid crystal panel 61R. The B light entering the second polarization beam splitter 66 as P-polarized light is transmitted through the polarization splitting surface of the second polarization beam splitter 66 to reach the reflective liquid crystal panel 61B.

The R light entering the reflective liquid crystal panel 61R is image-modulated and reflected thereby. The S-polarized light component of the image-modulated R light is reflected again by the polarization splitting surface of the second polarization beam splitter 66 and thereby returned toward the light source to be removed from light for projection. On the other hand, the P-polarized light component of the image-modulated R light is transmitted through the polarization splitting surface of the second polarization beam splitter 66 to proceed toward the dichroic prism 69 as light for projection.

The B light entering the reflective liquid crystal panel 61B is image-modulated and reflected thereby. The P-polarized light component of the image-modulated B light is transmitted again through the polarization splitting surface of the second polarization beam splitter 66 and thereby returned toward the light source to be removed from light for projection. On the other hand, the S-polarized light component of the image-modulated B light is reflected by the polarization splitting surface of the second polarization beam splitter 66 toward the dichroic prism 69 as light for projection.

Adjusting each of slow axes of the quarter-wave plates 62R and 62B provided between the second polarization beam splitter 66 and the reflective liquid crystal panels 61R and 61B, respectively, can reduce the influence of a disturbance of the polarization state in the black display state for each of the R light and the B light, as is the case for the G light.

Of the R light and B light that are thus combined into one light flux by the second polarization beam splitter 66 and then emerged therefrom, the B light is analyzed by the exit-side polarizing plate 68B and then enters the dichroic prism 69. The R light is transmitted through the polarizing plate 68B with no change as P-polarized light and then enters the dichroic prism 69.

The analysis by the exit-side polarizing plate 68B removes unnecessary components of the B light caused by passing the second polarization beam splitter 66, the reflective liquid crystal panel 61B, and the quarter-wave plate 62B.

The R light and the B light entering the dichroic prism 69 are transmitted through the dichroic film surface thereof, combined with the G light reflected by the dichroic film surface, and then reach the projection lens barrel 5.

The combined R, G and B light is enlarged and projected by the projection optical system in the projection lens barrel 5 onto the projection surface such as a screen.

The optical paths described above are used when the reflective liquid crystal panels operate in a white display state. Description will hereinafter be made of optical paths when the reflective liquid crystal panels operate in the black display state.

First, an optical path of the G light will be described. The P-polarized light component of the G light transmitted through the dichroic mirror 58 enters the entrance-side polarizing plate 59 and the first polarization beam splitter 60, is transmitted through the polarization splitting surface of the first polarization beam splitter 60, and then reaches the reflective liquid crystal panel 61G. Since the reflective liquid crystal panel 61G is in the black display state, the G light is reflected without image-modulation. Thus, the G light remains as P-polarized light after the reflection by the reflective liquid crystal panel 61G. Therefore, the G light is again transmitted through the polarization splitting surface of the first polarization beam splitter 60 and the entrance-side polarizing plate 59, and returned toward the light source to be removed from light for projection.

Next, optical paths of the R light and B light will be described. The P-polarized light components of the R light and B light reflected by the dichroic mirror 58 enter the entrance-side polarizing plate 64b. They emerge from the entrance-side polarizing plate 64b and then enter the color-selective phase plate 65. Since the color-selective phase plate 65 has the function of rotating the polarization direction of only the R light by 90 degrees, the R light and the B light enter the second beam splitter 66 as S-polarized light and P-polarized light, respectively.

The R light entering the second polarization beam splitter 66 as the S-polarized light is reflected by the polarization splitting surface thereof to reach the reflective liquid crystal panel 61R. The B light entering the second polarization beam splitter as the P-polarized light is transmitted through the polarization splitting surface thereof to reach the reflective liquid crystal panel 61B.

Since the reflective liquid crystal panel 61R is in the black display state, the R light entering the reflective liquid crystal panel 61R is reflected without image-modulation. In other words, the R light remains as the S-polarized light after the reflection by the reflective liquid crystal panel 61R. Thus, the R light is again reflected by the polarization splitting surface of the second polarization beam splitter 66, transmitted through the entrance-side polarizing plate 64b, and then returned toward the light source to be removed from light for projection. As a result, black is displayed.

The B light entering the reflective liquid crystal panel 61B is reflected without image-modulation since the reflective liquid crystal panel 61B is in the black display state. In other words, the B light remains as the P-polarized light after the reflection by the reflective liquid crystal panel 61B. Thus, the B light is again transmitted through the polarization splitting surface of the second polarization beam splitter 66, transmitted through the color-selective phase plate 65 and the entrance-side polarizing plate 64b, and then returned toward the light source to be removed from light for projection.

(Cooling Structure)

Next, the cooling structure in the projector of the present embodiment will be explained with reference to FIG. 3. As described above, this projector accommodates therein five fans 12A, 12B, 14, 17, and 18 for flowing airs in plural airflow paths described below to cool their respective cooling targets.

Figure 3:
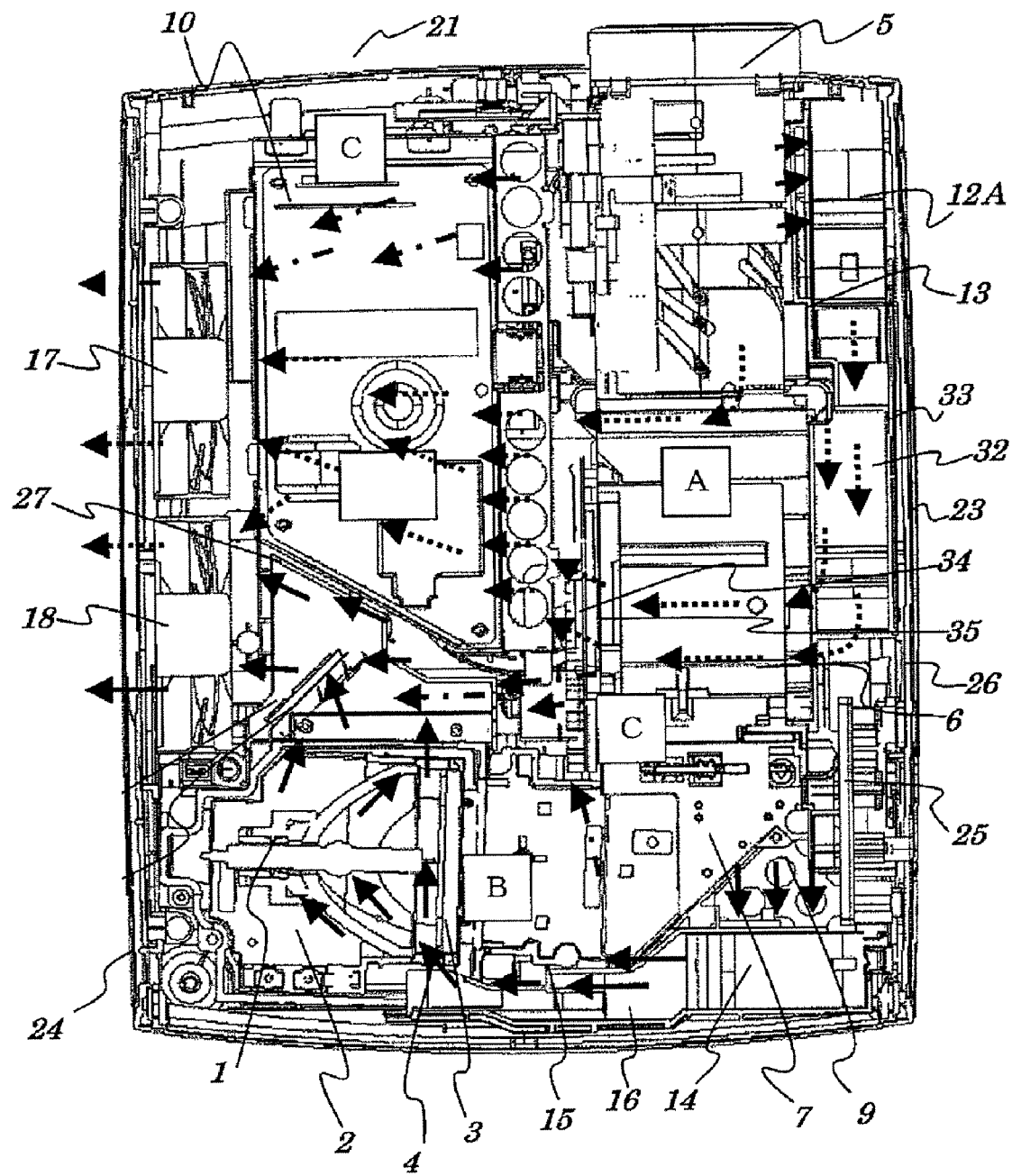
FIG. 3 is a plane view showing cooling airflows in the projector of Embodiment 1.

In an airflow path B indicated by solid-line arrows in FIG. 3, an air sucked into the chassis by the lamp cooling fan 14 is fed as a cooling air through the ducts 15 and 16 to the lamp 1. The airflow having cooled the lamp 1 is guided into the exhaust duct 27 to be exhausted to the outside of the chassis by the exhaust fan 18.

In an airflow path A indicated by dotted-line arrows in FIG. 3, an air sucked by the first and second cooling fans 12A and 12B from the outside of the chassis flows into the airflow path A through the air inlet 21a formed below the projection lens barrel 5. The second cooling fan 12B is disposed below the projection lens barrel 5.

A cooling air formed by this air cools the optical elements in the color-separating/combining optical system β housed inside the optical box 6. Most of this cooling air flows toward the PFC power supply board 8 and the ballast power supply board 10 adjacent to the optical box 6 to cool the electrical devices mounted on these boards 8 and 10. After that, the cooling air is exhausted to the outside of the chassis by the exhaust fan 18 and the power supply cooling fan 17.

In an airflow path C indicated by one-dot-chain-line arrows in FIG. 3, an air sucked through the air inlet 21b (not shown in FIG. 3) formed in the lower exterior case 21 flows into the airflow path C. A cooling air formed by this air is guided toward the ballast power supply board 10 and the PFC power supply board 8 together with an air inside the chassis by a sucking force of the power supply cooling fan 17 or the exhaust fan 18. After cooling these boards 8 and 10, the cooling air is exhausted to the outside of the chassis by the power supply cooling fan 17 and the exhaust fan 18.

Figure 4:
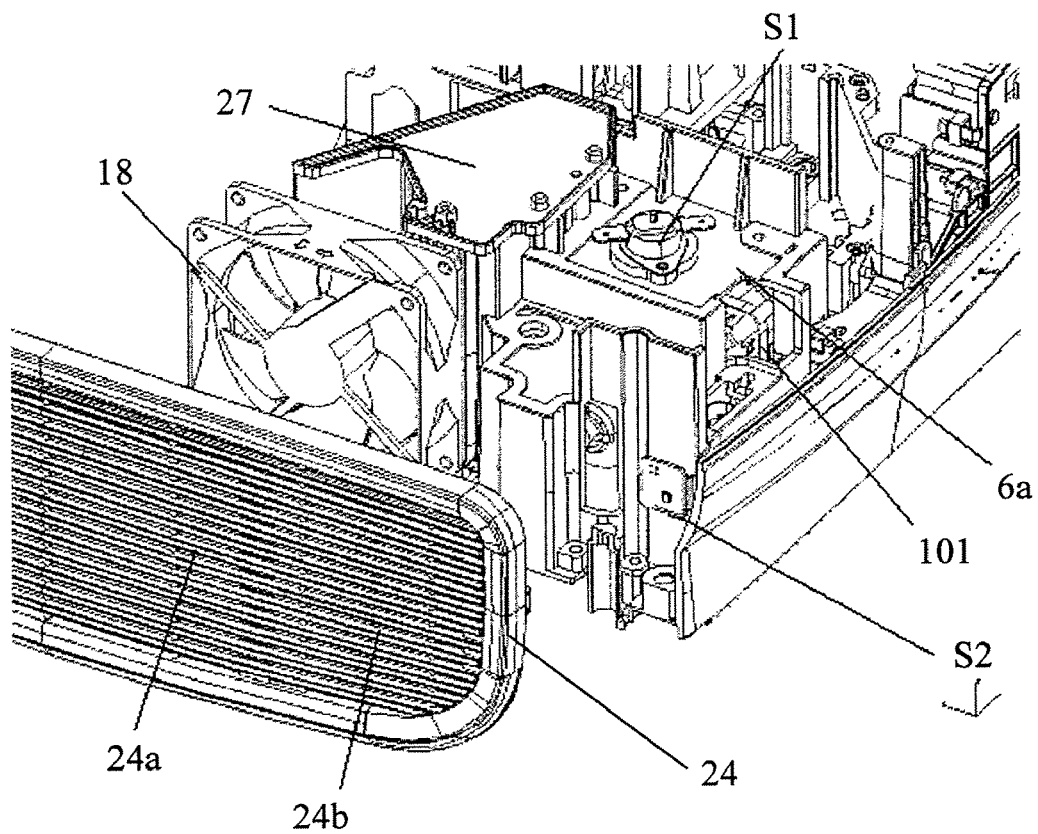
FIG. 4 is a perspective view showing a lamp cooling structure in the projector of Embodiment 1.

The cooling structure around the lamp 1 in the projector will be explained in detail using FIG. 4.

A lamp unit 101, constituted by the lamp 1 as a heat generating member and the lamp holder 2 which holds the lamp 1, is housed in the inside of the lamp case 6a which is the lamp-housing member as a heat insulating member. An opening for exhausting heat is formed in the lamp case 6a, and it is connected to an opening (inflow opening) formed in the exhaust duct 27. Another opening (outflow opening) formed in the exhaust duct 27 is formed so as to face an air intake plane of the exhaust fan 18.

Thereby, an air in the lamp case 6a passes through the inside of the exhaust duct 27 and reaches the exhaust fan 18, and then is exhausted to the outside through the exhaust air outlet 24a formed in the downstream side from the exhaust fan 18. As described above, the exhaust air outlet 24a is formed in the second side plate 24 which constitutes part of the exterior surface of the projector.

In such a configuration, since the lamp 1 generates much heat in its lighting state, the inside of the lamp case 6a becomes a high temperature of nearly 200° C. Therefore, the exhausted air from the exhaust air outlet 24a becomes a high temperature even if a cold external air is mixed with the hot air after having cooled the lamp 1.

Inside the lamp case 6a, a first temperature sensor S1 is provided which detects a temperature inside the lamp case 6a. A second temperature sensor S2 which detects a temperature (ambient temperature) of an air (external air) flowing in from the air inlet 24b formed in the second side plate 24 is provided in a region in the vicinity of the air inlet 24b (region facing an outer surface of the lamp case 6a and the air inlet 24b). The second temperature sensor S2 corresponds to a "temperature detector".

In a state in which the exhaust air outlet 24a is not covered (blocked) by an obstacle which will be described later, the second temperature sensor S2 can detect a temperature equivalent to that of the external air (for example, a temperature in a room in which the projector is installed) even though it is disposed in the vicinity of the lamp case 6a.

The first temperature sensor S1 is a mechanical sensor which uses a bimetal and the like to be able to protect the lamp 1 even if other temperature sensors including the second temperature sensor S2 break down. Also, the first temperature sensor S1 has a function to block an electric current which lights the lamp 1 in a case where the temperature detected by the first temperature sensor S1 exceeds a certain temperature (temperature higher than detection temperature ranges of the other temperature sensors).

In contrast, the second temperature sensor S2 is a temperature sensor that uses an IC element, and outputs an electrical signal indicating the detected temperature. Therefore, electrical control based on the output of the second temperature sensor S2 can be performed.

Next, the configuration of the control system in the present embodiment will be explained using FIG. 5. The control system includes a cooling fan control system, a lamp control system, and a display control system.

Figure 5:
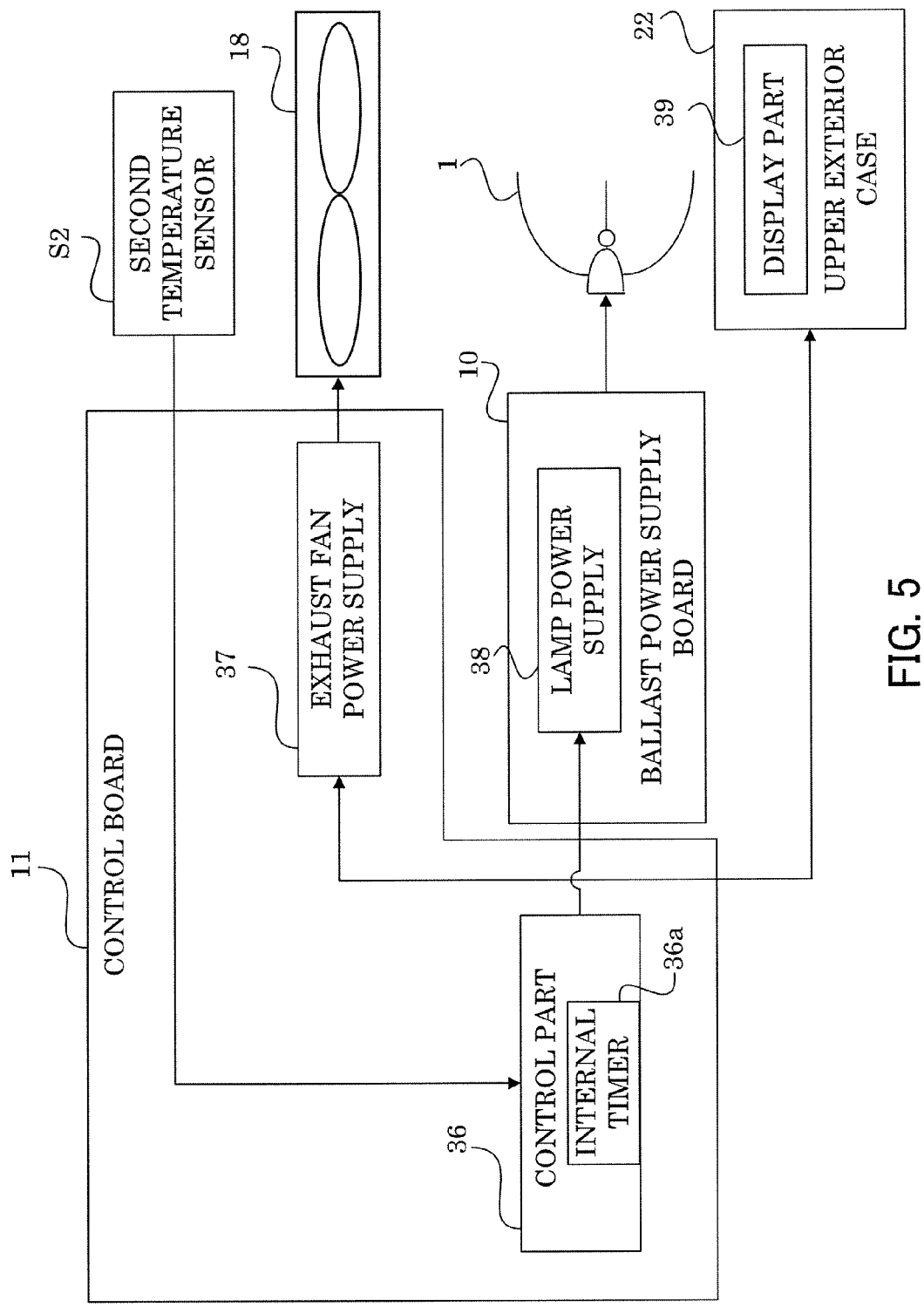
FIG. 5 is a block diagram showing a configuration of a control system of the projector of Embodiment 1.

In FIG. 5, reference numeral 36 denotes a control part as a controller, and 37 denotes an exhaust fan power supply. The control part 36 and the exhaust fan power supply 37 are mounted on the control board 11 shown in FIG. 1.

Reference numeral 38 denotes a lamp power supply which is mounted on the ballast power supply board 10 shown in FIG. 1.

Reference numeral 39 denotes a display part constituted by an LCD or the like which is provided on the upper exterior case 22.

The control part 36 controls operations of the exhaust fan power supply 37, the lamp power supply 38, and the display part 39 based on temperature information detected by the second temperature sensor S2. Further, the control part 36 includes a CPU, a nonvolatile memory which stores a computer program executed by the CPU, an internal work memory, and an internal timer 36a.

The exhaust fan power supply 37 supplies drive electricity to the exhaust fan 18 to cool the lamp 1.

The display part 39 is electrically connected to the control part 36 and performs various displays according to the display signals from the control part 36. Specifically, the control part 36 outputs a warning display signal to the display part 39 when the temperature detected by the second temperature sensor S2 exceeds a predetermined temperature (hereinafter referred to as warning reference temperature). The display part 39 performs a warning display to warn a user of a temperature abnormality in accordance with the warning display signal.

Figure 6:
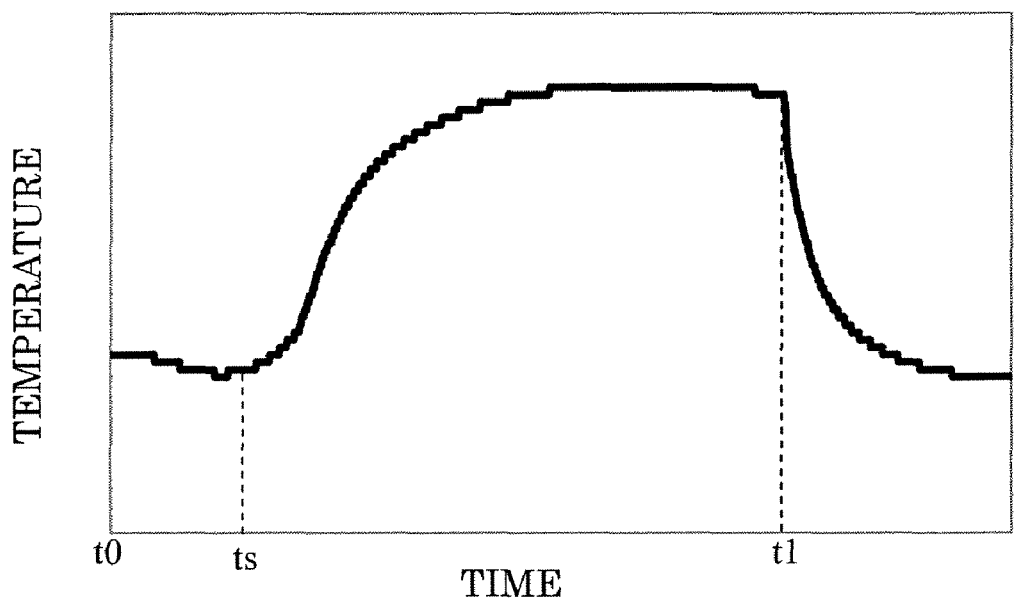
FIG. 6 is a graph showing a change of a temperature inside of a chassis of the projector of Embodiment 1.

FIG. 6 shows a temperature change inside of the chassis of the projector (apparatus) detected by the second temperature sensor S2 which accompanies turning off and turning on of the lamp 1 as the heat generating member in this configuration.

A time t0 represents a time when the lamp 1 was previously turned off, and a time t1 represents a current (next) lighting start time of the lamp 1. The turning on of the lamp 1 (that is, the application of voltage to the lamp 1) is performed substantially at the same timing as that of the power on of the projector. Therefore, the lighting start time t1 of the lamp 1 can be also called as power-on time of the projector. Further, the rotations of the fans 12A, 12B, 14, 17 and 18 (that is, the application of voltage to each fan) are started substantially at the same timing as that of the power on of the projector Therefore, the lighting start time t1 of the lamp 1 can be also called as fan rotation start time.

After the lamp 1 is turned off, the inside of the chassis is forcibly cooled off by driving the exhaust fan 18, which slightly decreases the temperature inside of the chassis. However, immediately following the forced cooling (time ts), the temperature inside of the chassis increases due to residual heat of the lamp 1, and the increased temperature is maintained over a relatively long period of time.

When the lamp 1 is again turned on (re-lit) in such a state, restarting the drive of the exhaust fan 18 decreases the temperature inside of the chassis. However, similarly to conventional projectors, if the warning reference temperature is set lower than the temperature detected by the second temperature sensor S2 at the time of the re-lighting of the lamp (time t1), the warning display is performed even though the temperature decrease is essentially a normal temperature change.

Figure 7:
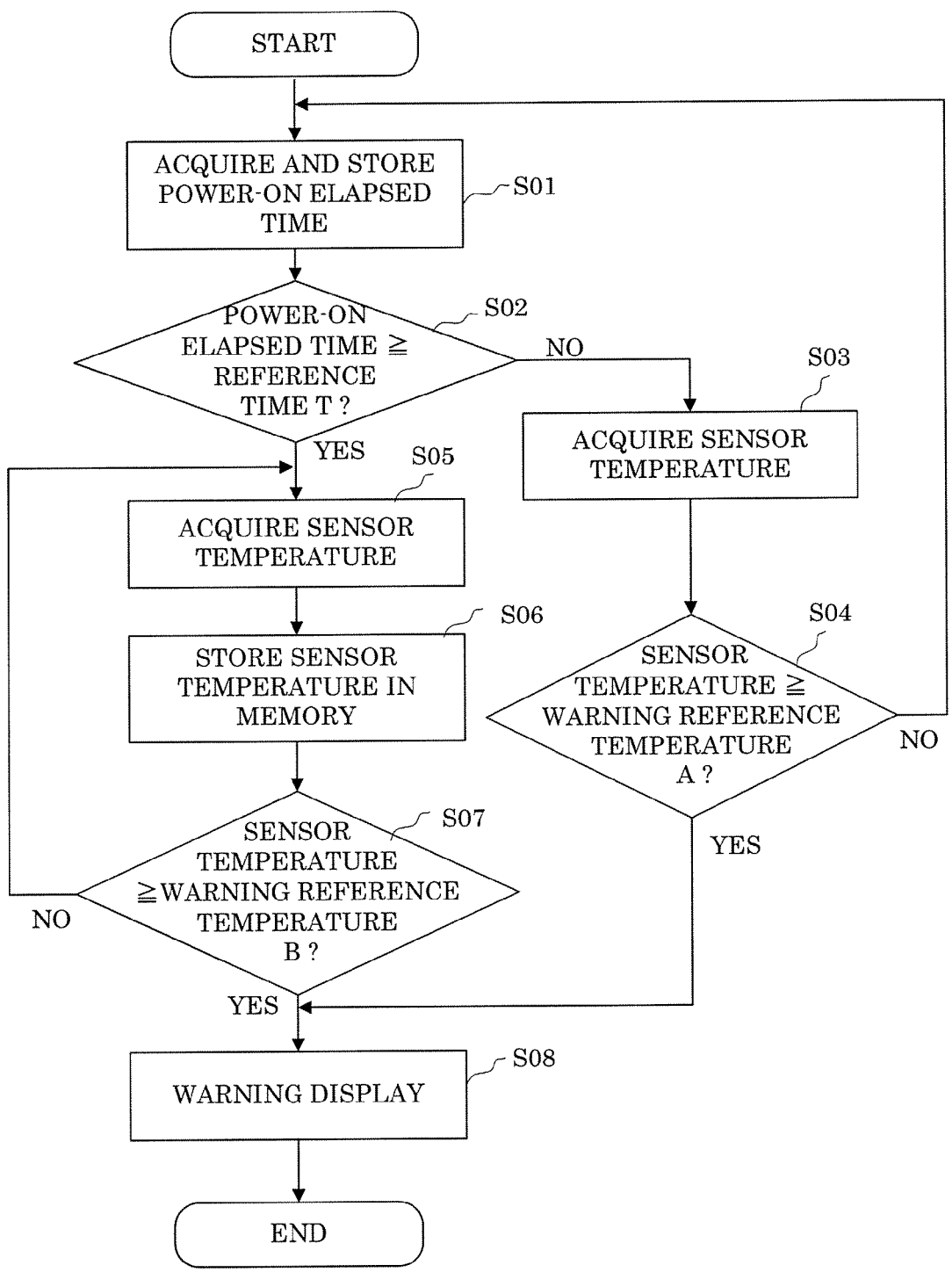
FIG. 7 is a flowchart showing a protection operation process in Embodiment 1.

Therefore, in the present embodiment, as shown in FIG. 7, an elapsed time from when the power of the projector is turned on (or the lamp 1 is turned on, or the rotations of the fans are started) is measured, and the warning reference temperature is changed in accordance with the elapsed time.

FIG. 7 shows a processing for a temperature abnormality inside of the chassis performed by the control part 36. The control part 36 executes this processing according to the computer program stored in the nonvolatile memory described above.

When a power switch (or a lamp lighting switch), not shown, which is provided in the projector, is on-operated and thereby the lamp 1 is turned on, the control part 36 causes the internal timer 36a to count time to start measurement of the elapsed time from when the power of the projector is turned on (hereinafter referred to as power-on elapsed time).

The power-on elapsed time can be also called as elapsed time (lamp-on elapsed time) from when the lamp 1 is turned on or elapsed time (fan rotation elapsed time) from when the rotations of the fans are started.

In step S01, the control part 36 acquires the power-on elapsed time measured by the internal timer 36a to store it in the internal work memory.

Next, in step S02, the control part 36 determines whether or not the power-on elapsed time acquired and stored in step S01 has reached a predetermined time (hereinafter referred to as reference time) T. The reference time T is stored in advance in the nonvolatile memory in the control part 36.

If the power-on elapsed time has not reached the reference time T, the processing advances to step S03 where the control part 36 acquires the temperature detected by the second temperature sensor S2 (hereinafter referred to as sensor temperature). Then, in step S04, the control part 36 determines whether or not the sensor temperature is equal to or higher than a warning reference temperature A. The warning reference temperature A is set higher than a warning reference temperature B which will be described later. The warning reference temperature A is stored in advance in the nonvolatile memory.

In step S04, if the sensor temperature is lower than the warning reference temperature A, the control part 36 determines that no temperature abnormality is occurring inside the chassis and then returns to step S01. The control part 36 repeatedly performs the processing of step S01 to step S04 in this manner to continuously determine the presence or absence of the temperature abnormality inside of the chassis with the warning reference temperature A as a threshold before the power-on elapsed time reaches the reference time T.

On the other hand, if the sensor temperature is equal to or higher than the warning reference temperature A (or the sensor temperature is higher than the warning reference temperature A) in step S04, the processing advances to step S08 where the control part 36 causes the display part 39 to perform the warning display showing the temperature abnormality as a protection operation.

Further, if the power-on elapsed time has reached the reference time T in step S02, the processing advances to step S05 where the control part 36 acquires the sensor temperature. Then, in step S06, the control part 36 stores the acquired sensor temperature in the internal work memory.

Next, in step S07, the control part 36 determines whether or not the sensor temperature is equal to or higher than the warning reference temperature B. The warning reference temperature B is stored in advance in the nonvolatile memory.

If the sensor temperature is lower than the warning reference temperature B, the control part 36 determines that no temperature abnormality is occurring inside the chassis and then returns to step S05. The control part 36 repeatedly performs the processing of step S05 to step S07 in this manner to continuously determine the presence or absence of the temperature abnormality inside of the chassis with the warning reference temperature B as another threshold after the power-on elapsed time has reached the reference time T.

On the other hand, if the sensor temperature is equal to or higher than the warning reference temperature B (or the sensor temperature is higher than the warning reference temperature B) in step S07, the processing advances to step S08 where the control part 36 causes the display part 39 to perform the warning display showing the temperature abnormality.

In the flowchart of FIG. 7, the case where the warning display is performed as one of the protection operations in step S08 was described. However, at least one other protection operation may be performed in place of the warning display or together with the warning display. The other protection operations include, for example, generating a warning sound from a speaker, increasing a rotating speed of the exhaust fan 18, and shutting power supply to the lamp power supply 38 to turn off the lamp 1. This is the same in Embodiment 2 which will be described later.

Figure 8:
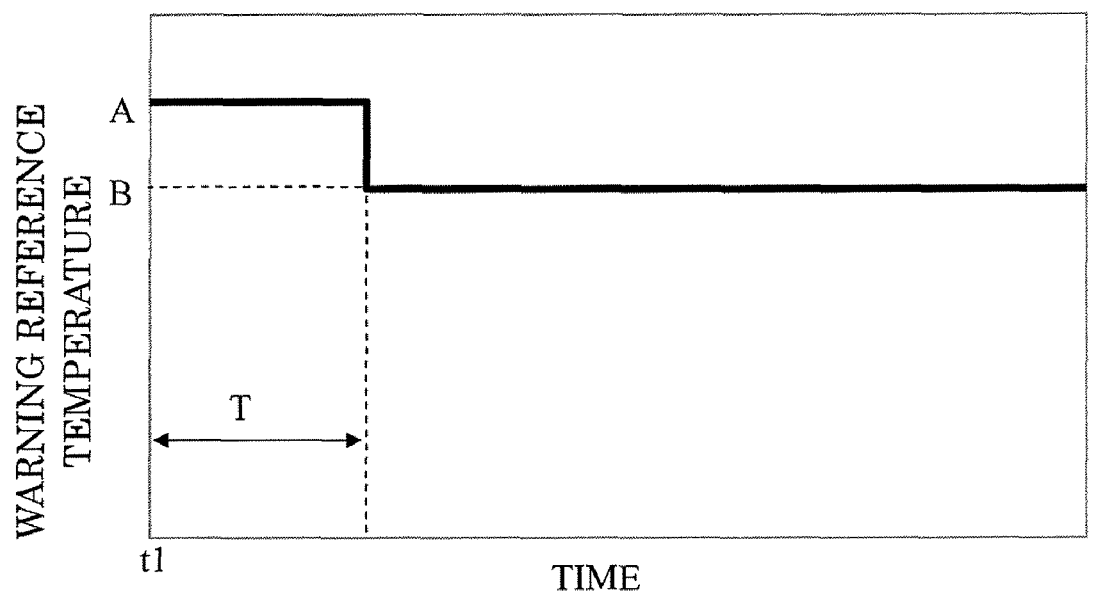
FIG. 8 is a graph showing a change of a warning reference temperature in Embodiment 1.

FIG. 8 shows the warning reference temperatures A and B which are changed by the control part 36 in accordance with the power-on elapsed time. Before the power-on elapsed time from the lighting start time t1 reaches the reference time T, the warning reference temperature is set to the temperature A. On the other hand, after the power-on elapsed time reaches the reference time T, the warning reference temperature is changed to the temperature B lower than the temperature A.

Figure 9:
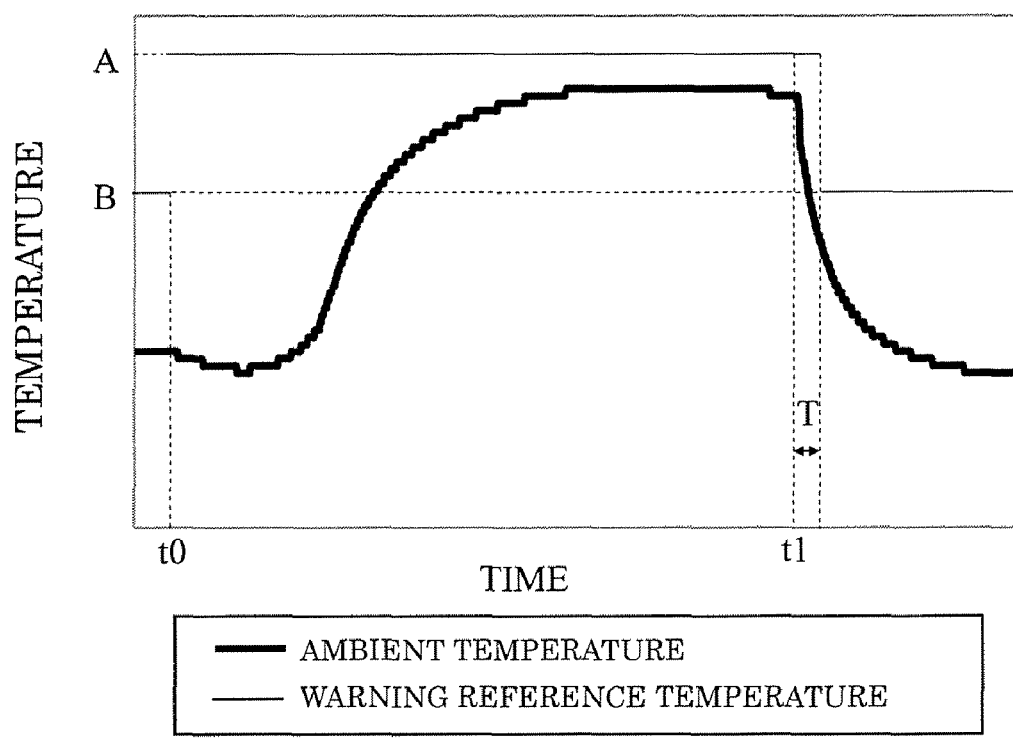
FIG. 9 is a graph showing the relationship between the temperature inside of the chassis and the warning reference temperature in Embodiment 1.

FIG. 9 shows the relationship between the warning reference temperatures A and B and the sensor temperature which changes accompanying the turning off and turning on (re-lighting) of the lamp 1.

The bold line in the figure shows the change of the sensor temperature when the lamp 1 is re-lit after the lamp 1 has been turned off (time to), which is the same as that illustrated in FIG. 6. Further, the fine line shows warning reference temperatures A and B.

After the lamp 1 has been turned off, the warning reference temperature is set to the temperature A until the power-on elapsed time (elapsed time from the time t1) reaches the reference time T. This warning reference temperature A is set high such that the sensor temperature increased due to the residual heat of lamp 1 does not exceed it.

Further, after the power-on elapsed time reaches the reference time T, the warning reference temperature is changed to the temperature B lower than the temperature A. This is because the sensor temperature is decreased since the heat inside the chassis including the residual heat of the lamp 1 is exhausted to the outside by the exhaust fan 18 that is re-driven together with the re-lighting of the lamp 1. The warning reference temperature B is maintained during the subsequent operation (image projection) of the projector, and it is used as the threshold for determining the temperature abnormality inside the chassis due to the exhaust air outlet 24a being blocked by an obstacle such as a wall.

As described above, in the present embodiment, immediately after the turning off of the lamp 1 (that is, until the reference time T elapses), the warning reference temperature A, which is higher than the warning reference temperature B set after the reference time T has elapsed, is set so that the protection operation is not mistakenly performed due to the influence of the residual heat of the lamp 1 inside the chassis. Thereby, unnecessary performing of the protection operation can be avoided in a case where the lamp 1 is re-lit within a short time after the turning off thereof.

Embodiment 2

Figure 10:
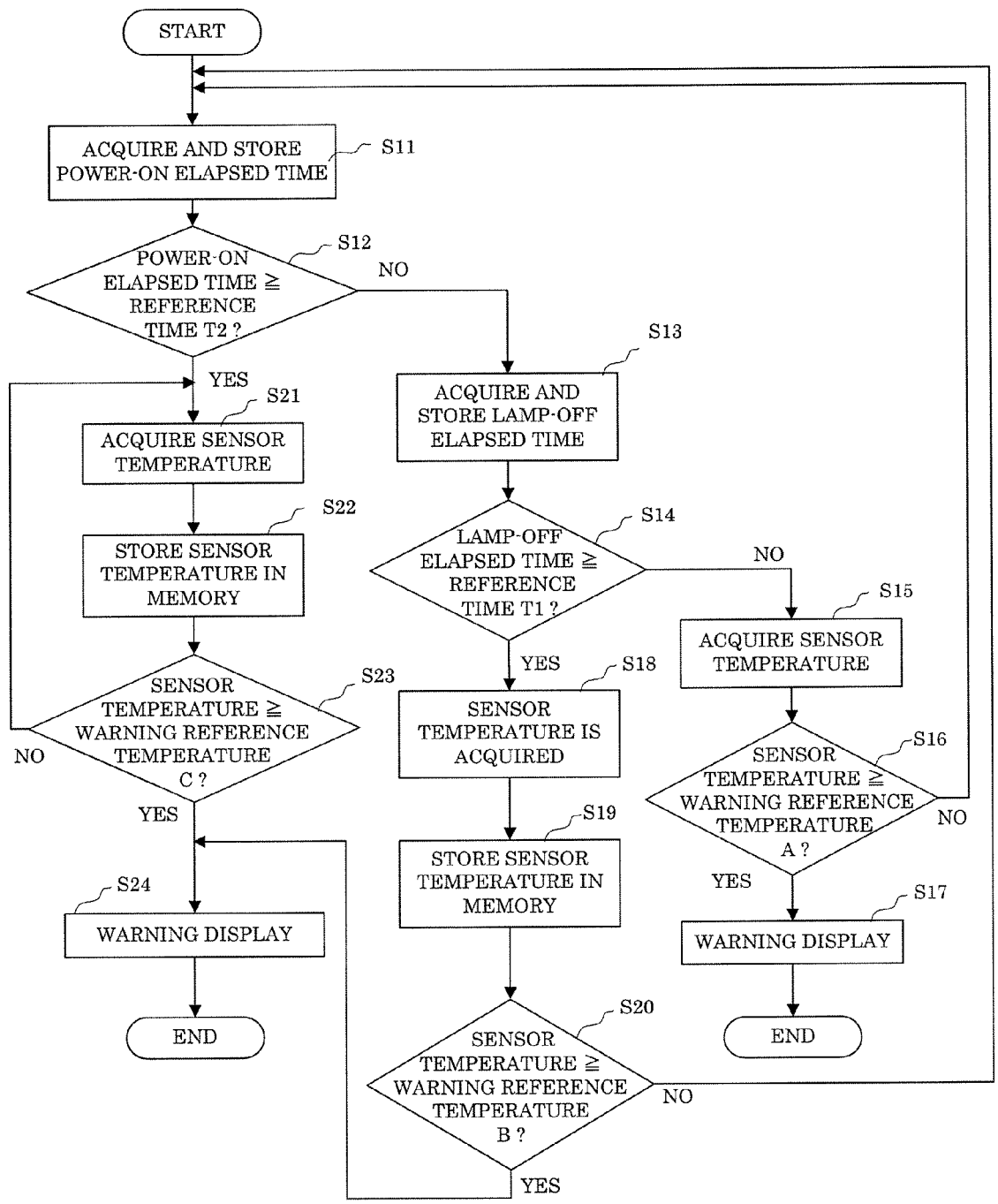
FIG. 10 is a flowchart showing a protection operation process in a projector which is a second embodiment (Embodiment 2) of the present invention.

FIG. 10 shows a processing for a temperature abnormality inside of the chassis performed by the control part 36.

The processing in the present embodiment is performed in the projector explained in Embodiment 1. Constituent components in this embodiment identical to or having a similar function to those in Embodiment 1 are designated by the same reference numerals as those of Embodiment 1.

When the power switch (or the lamp lighting switch) provided in the projector is off-operated and thereby the lamp 1 is turned off, the control part 36 causes a first timer in the internal timer 36a to count time to start measurement of an elapsed time from when the lamp 1 is turned off (hereinafter referred to as lamp-off elapsed time). After that, when the power switch (or the lamp lighting switch) is on-operated and thereby the lamp 1 is turned on, the control part 36 causes a second timer in the internal timer 36a to count time to start measurement of an elapsed time from when the power of the projector is turned on (hereinafter referred to as power-on elapsed time).

As described in Embodiment 1, the power-on elapsed time can be also called as elapsed time (lamp-on elapsed time) from when the lamp 1 is turned on or elapsed time (fan rotation elapsed time) from when the rotations of the fans are started.

In step S11, the control part 36 acquires the power-on elapsed time measured by the second timer to store it in the internal work memory.

Next, in step S12, the control part 36 determines whether or not the power-on elapsed time acquired and stored in step S11 has reached a reference time T2 as a second predetermined time. The reference time T2 is stored in advance in the non-volatile memory in the control part 36. If the power-on elapsed time has not reached the reference time T2, the processing advances to step S13 where the control part 36 acquires the lamp-off elapsed time from the previous turning off of the lamp 1 to the current turning on (re-lightning) of the lamp 1, measured by the first timer to store it in the internal work memory.

Then, in step S14, the control part 36 determines whether or not the lamp-off elapsed time acquired and stored in step S13 has reached a reference time T1 as a first predetermined time. The reference time T1 is stored in advance in the non-volatile memory in the control part 36. If the lamp-off elapsed time has not reached the reference time T1, the processing advances to step S15 where the control part 36 acquires a temperature (sensor temperature) detected by the second temperature sensor S2.

Next, in step S16, the control part 36 stores the sensor temperature in the internal nonvolatile memory, and then determines whether or not the sensor temperature is equal to or higher than a warning reference temperature A. The warning reference temperature A is set higher than warning reference temperatures B and C which will be described later. The warning reference temperature A is stored in advance in the nonvolatile memory. If the sensor temperature is lower than the warning reference temperature A, the control part 36 determines that no temperature abnormality is occurring inside the chassis and then returns to step S11.

The control part 36 repeatedly performs the processing of step S11 to step S16 in this manner to continuously determine the presence or absence of the temperature abnormality inside of the chassis with the warning reference temperature A as a threshold before the lamp-off elapsed time reaches the reference time T1 and before the power-on elapsed time reaches the reference time T2.

On the other hand, if the sensor temperature is equal to or higher than the warning reference temperature A (or the sensor temperature is higher than the warning reference temperature A) in step S16, the processing advances to step S17 where the control part 36 causes the display part 39 to perform a warning display showing the temperature abnormality as a protection operation.

Further, if the lamp-off elapsed time has reached the reference time T1 in step S14, the processing advances to step S18 where the control part 36 acquires the sensor temperature.

Then, in step S19, the control part 36 stores the acquired sensor temperature in the internal work memory.

Next, in step S20, the control part 36 determines whether or not the sensor temperature is equal to or higher than the warning reference temperature B. The warning reference temperature B is set lower than the warning reference temperature C which will be described later. The reference temperature B is stored in advance in the nonvolatile memory.

If the sensor temperature is lower than the warning reference temperature B, the control part 36 determines that no temperature abnormality is occurring inside the chassis and then returns to step S11.

The control part 36 repeatedly performs the processing of step S11 to step S14 and step S18 to step S20 in this manner to continuously determine the presence or absence of the temperature abnormality inside of the chassis with the warning reference temperature B as a threshold after the lamp-off elapsed time reaches the reference time T1 and before the power-on elapsed time reaches the reference time T2.

On the other hand, if the sensor temperature is equal to or higher than the warning reference temperature B (or the sensor temperature is higher than the warning reference temperature B) in step S20, the processing advances to step S24 where the control part 36 causes the display part 39 to perform the warning display showing the temperature abnormality as the protection operation.

Further, if the power-on elapsed time has reached the reference time T2 in step S12, the processing advances to step S21 where the control part 36 acquires the sensor temperature. Then, in step S22, the control part 36 stores the acquired sensor temperature in the internal work memory.

Next, in step S23, the control part 36 determines whether or not the sensor temperature is equal to or higher than the warning reference temperature C. The warning reference temperature C is stored in advance in the nonvolatile memory. If the sensor temperature is lower than the warning reference temperature C, the control part 36 determines that no temperature abnormality is occurring inside the chassis and then returns to step S21.

The control part 36 repeatedly performs the processing of step S21 to step S23 in this manner to continuously determine the presence or absence of the temperature abnormality inside of the chassis with the warning reference temperature C as a threshold after the power-on elapsed time reaches the reference time T2.

On the other hand, if the sensor temperature is equal to or higher than the warning reference temperature C (or the sensor temperature is higher than the warning reference temperature B) in step S23, the processing advances to step S24 where the control part 36 causes the display part 39 to perform the warning display showing the temperature abnormality.

Figure 11:
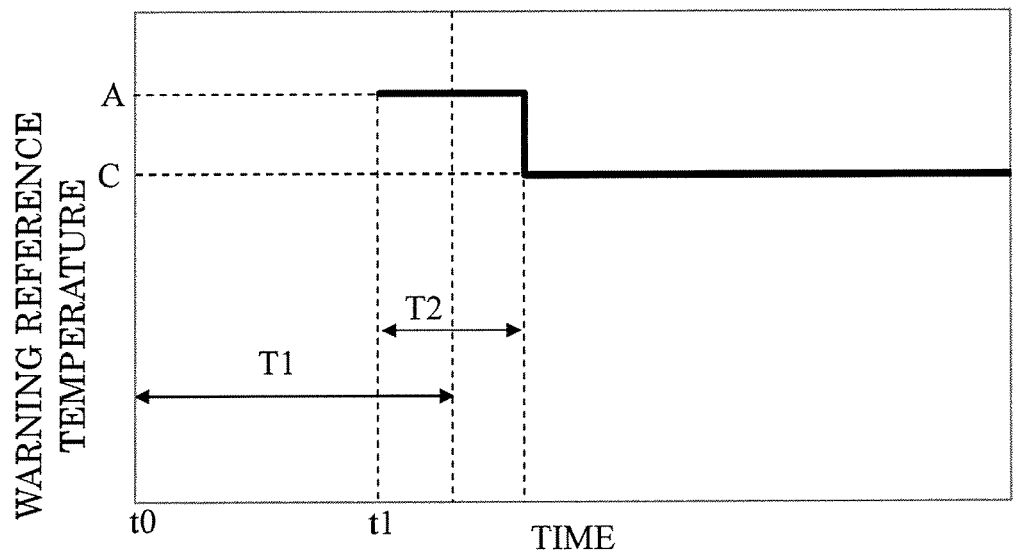
FIGS. 11 and 12 are graphs showing a change of a warning reference temperature in Embodiment 2.
Figure 12:
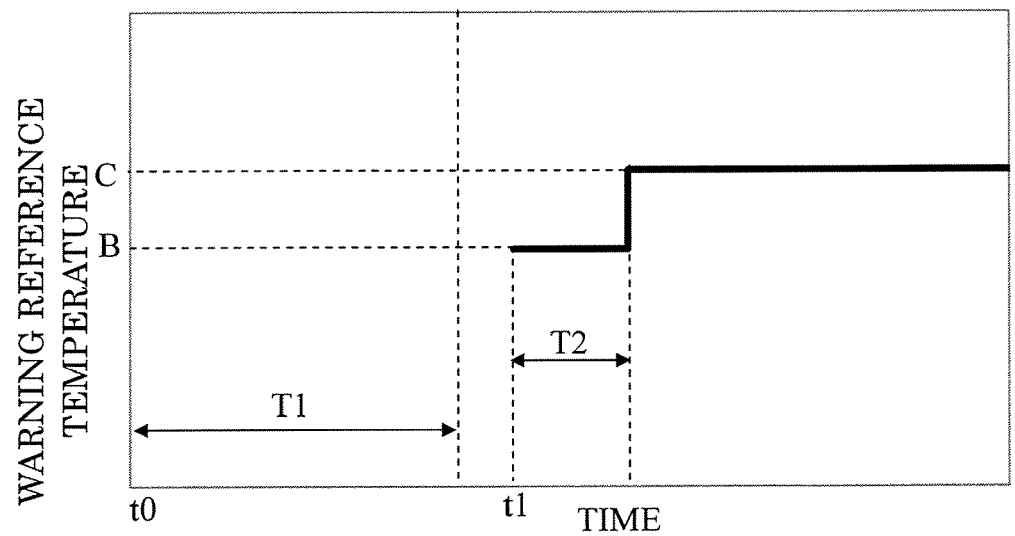

FIGS. 11 and 12 show that the warning reference temperature is changed in accordance with the lamp-off elapsed time and the power-on elapsed time. A time t0 represents a time when the lamp 1 was previously turned off and a time t1 represents a current (next) lighting start time of the lamp 1.

As shown in FIG. 11, when the lamp-off elapsed time (t1−t0) from the previous turning off of the lamp 1 to the current turning on (re-lighting) of the lamp 1 has not reached the reference time T1, the warning reference temperature is set to the temperature A until the power-on elapsed time from the current turning on of the lamp 1 reaches the reference time T2. In other words, in a case in which the lamp 1 is re-lit in a state in which the temperature inside of the chassis is high due to the influence of the residual heat of the lamp 1 after the previous turning off thereof, unnecessary performing of the protection operation can be avoided by setting the warning reference temperature to the temperature A which is higher than the temperature C, just as in Embodiment 1.

On the other hand, as shown in FIG. 12, if the lamp-off elapsed time (t1−t0) has reached the reference time T1, the warning reference temperature is set to the temperature B until the power-on elapsed time reaches the reference time T2. In other words, in a case where the lamp 1 is re-lit in a state in which the lamp 1 has cooled and the temperature inside of the chassis is low after the previous turning off of the lamp 1, the temperature abnormality occurring at an early stage after the turning on of the lamp 1 can be quickly detected by setting the warning reference temperature to the temperature B which is lower than the temperature C, and thereby the protection operation can be performed.

As described above, the present embodiment measures the lamp-off elapsed time from when the lamp 1 was turned off to when the lamp 1 is again turned on (re-lit), and changes the warning reference temperature as the predetermined temperature between the temperatures A and B in accordance with the lamp-off elapsed time.

Further, in both cases shown in FIGS. 11 and 12, after the power-on elapsed time reaches the reference time T2, the warning reference temperature is changed to the temperature C. The warning reference temperature C is maintained during the subsequent operation (image projection) of the projector, and it is used as the threshold for determining the temperature abnormality inside the chassis due to the exhaust air outlet 24a being blocked by an obstacle such as a wall.

In each of the above embodiments, the predetermined temperature which is the threshold at which the protection operation is performed is changed in accordance with the elapsed time from when the power of the projection is turned on (the light source is turned on) or the elapsed time from when the light source is turned off to when the power of the projection is again turned on (the lamp is again turned on), in other words, in accordance with whether or not the influence of the residual heat of the light source remains. Therefore, according to each of the embodiments, mistaken activation or inactivation of the protection function at the time of the re-lighting of the light source due to the influence of the residual heat after the light source is turned off can be avoided.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, in the above embodiments, the description was made of the threshold setting for detecting the temperature abnormality using the temperature sensor provided in the lamp cooling structure. However, a similar threshold setting may be applied to a temperature sensor provided in a cooling structure for a heat generating member other than the lamp.

Further, for a projector, a transmissive liquid crystal panel and a digital micromirror device (DMD) may be used instead of the reflective liquid crystal panel.

This application claims the benefit of Japanese Patent Application No. 2007-204921, filed on Aug. 7, 2007, which is hereby incorporated by reference herein in its entirety.

What is claimed is:

1. An image projection apparatus that projects an image using light from a light source, comprising:
   a temperature detector that detects a temperature inside of the apparatus; and
   a controller that performs a protection operation when the temperature detected by the temperature detector is higher than a predetermined temperature, wherein the controller measures an elapsed time from when a power of the apparatus or the light source is turned on, and changes the predetermined temperature in accordance with the elapsed time.

2. An image projection apparatus according to claim 1, wherein the controller sets the predetermined temperature, before the elapsed time reaches a predetermined time, higher than the predetermined temperature, after the elapsed time reaches the predetermined time.

3. An image projection apparatus according to claim 1, wherein the controller sets the predetermined temperature, before the elapsed time reaches a predetermined time, lower than the predetermined temperature, after the elapsed time reaches the predetermined time.

4. An image projection apparatus according to claim 1, wherein the controller measures a first elapsed time from when the power of the apparatus or the light source is turned off to when the power of the apparatus or the light source is next turned on, and measures a second elapsed time that is the elapsed time from when the power of the apparatus or the light source is next turned on, wherein, before the first elapsed time reaches a first predetermined time, the controller sets the predetermined temperature, before the second elapsed time reaches a second predetermined time, higher than the predetermined temperature, after the second elapsed time reaches the second predetermined time, and wherein, after the first elapsed time reaches the first predetermined time, the controller sets the predetermined temperature, before the second elapsed time reaches the second predetermined time, lower than the predetermined temperature, after the second elapsed time reaches the second predetermined time.

5. An image projection apparatus according to claim 1, wherein the protection operation includes at least one of displaying a warning, generating a warning sound, turning off the light source, and increasing a rotating speed of a fan used for cooling the apparatus.

6. An image projection apparatus that projects an image using light from a light source, comprising:

a temperature detector that detects a temperature inside of the apparatus; and a controller that performs a protection operation when the temperature detected by the temperature detector is higher than a predetermined temperature, wherein the controller measures an elapsed time from when a power of the apparatus or the light source is turned off to when the power of the apparatus or the light source is next turned on, and changes the predetermined temperature in accordance with the elapsed time.

7. The image projection apparatus according to claim 6, wherein the protection operation includes at least one of displaying a warning, generating a warning sound, turning off the light source, and increasing a rotating speed of a fan used for cooling the apparatus.

* * * * *